United States Patent [19]

Nomura et al.

[11] Patent Number: 4,965,434
[45] Date of Patent: Oct. 23, 1990

[54] FAR-INFRARED HEATER

[75] Inventors: Shoichi Nomura, Kobe; Akira Kitagawa, Osaka; Hidekata Kawanishi, Ikeda; Tsuneo Shibata, Kawanishi, all of Japan

[73] Assignees: Matsushita Electric Industrial Co., Ltd., Kadoma; Shima Trading Co., Ltd., Osaka; Parker Kako Co., Ltd., Tokyo, all of Japan

[21] Appl. No.: 332,904

[22] Filed: Apr. 4, 1989

[30] Foreign Application Priority Data

Apr. 8, 1988 [JP] Japan .................. 63-87516

[51] Int. Cl.$^5$ ............................. H05B 3/10
[52] U.S. Cl. .................... 392/407; 252/587; 501/12
[58] Field of Search ............... 219/354, 347; 252/587; 501/12, 88

[56] References Cited

U.S. PATENT DOCUMENTS

| 4,377,618 | 3/1983 | Ikeda et al. | 219/354 |
| 4,419,115 | 12/1983 | Johnson, Jr. et al. | 501/12 |
| 4,426,570 | 1/1984 | Hikino et al. | 219/354 |
| 4,680,045 | 7/1987 | Osafune et al. | 501/12 |

FOREIGN PATENT DOCUMENTS

| 54-10438 | 1/1979 | Japan | 219/354 |
| 57-23394 | 5/1982 | Japan | 219/354 |
| 60-86036 | 5/1985 | Japan | 501/12 |
| 60-96533 | 5/1985 | Japan | 501/12 |
| 146756 | 7/1986 | Japan | 501/88 |

Primary Examiner—A. D. Pellinen
Assistant Examiner—Geoffrey S. Evans
Attorney, Agent, or Firm—Armstrong, Nikaido, Marmelstein, Kubovcik & Murray

[57] ABSTRACT (1) a composition for forming a far-infrared-emitting layer, the composition comprising (i) a liquid composition which contains a ceramics-forming material and which is capable of forming a ceramics layer by gelation induced by polymerization and (ii) at least one pigment capable of emitting far-infrared radiation; and (2) a far-infrared heater comprising a heat source, and a protective means which has a far-infrared-emitting layer formed thereon by applying thereto the composition as defined above in (1) to cause gelation of the coating layer by polymerization.

1 Claim, 2 Drawing Sheets

FAR-INFRARED HEATER

The present invention relates to a composition for forming a layer capable of emitting far-infrared radiation and to a heater utilizing far-infrared radiation.

Conventional heaters include those which have a protective means made of crystallized glass, quartz glass, silicate glass or the like and provided therein to protect a heat source such as a burner for combustion of petroleum or flammable gases, or an electrically heated wire, e.g. nichrome wire, iron-chromium-aluminum wire, tungsten wire or the like. Such heaters are used for cooking devices for household use, those for commercial use, air-conditioning systems, baking furnaces, dryers, reactors, medical appliances or the like. Representative of these heaters are halogen heaters, Miraclon heaters, quartz heaters, etc.

In recent years, heaters utilizing far-infrared radiation are drawing attention for potential benefits of increasing the heating effect and reducing the heating time for energy savings and improving the quality of, and adding new functions to, cooking devices and air-conditioning systems.

However, during the operation of said conventional heater, the far-infrared radiation of 3 to 5 $\mu$m or more in wavelength emitted from a heating source such as flames or electrically heated wires is absorbed by the crystallized glass, quartz glass, silicate glass or the like used as the material for the protective means. Consequently only the secondary radiation from such protective means is available at a significantly reduced dose.

To overcome this disadvantage, investigations are under way. For example, a heater utilizing far-infrared radiation has been proposed in which a layer capable of emitting far-infrared radiation is formed by a certain method on the surface of a conventional protective means.

Throughout the specification and the appended claims, the term "far-infrared-emitting layer" is intended to denote a layer capable of emitting far-infrared radiation, and the term "far-infrared heater" refers to a heater utilizing far-infrared radiation.

Various methods have been heretofore proposed for forming a far-infrared-emitting layer. The proposed methods include the following two types:

(1) thermal spray coating methods and
(2) coating methods using an inorganic salt as a binder.

Yet these coating methods have drawbacks. The thermal spray coating methods generally comprise blasting the surface of protective means and applying to the surface a material capable of emitting far-infrared radiation (hereinafter referred to as "far-infrared-emitting material") by a plasma thermal spray coating method. Consequently this method is easy but very expensive to carry out because of high running costs as for thermal spray coating means.

Furthermore, far-infrared heaters with a far-infrared-emitting layer formed by a thermal spray coating method pose the following various problems.

(i) There is a great difference in thermal expansion between the protective means and the layer formed by thermal spraying and they are only physically united with each other. For these reasons, the layer is likely to peel off on exposure to high temperatures or thermal shock.

(ii) Because the far-infrared-emitting layer (layer applied by thermal spraying) is porous, it is impossible to use a protective means made of quartz glass or the like which has a low resistance to a corrosive attack by sodium chloride or the like.

(iii) Since only limited types of far-infrared-emitting materials are usable for forming a far-infrared-emitting layer, it is difficult to produce a far-infrared-emitting layer which matches the far-infrared absorption characteristics of materials, articles or the like to be heated.

(iv) Because the far-infrared-emitting materials have a substantially limited range of color, it is difficult to impart a desired color to a far-infrared-emitting layer.

As described above, the thermal spray coating methods are expensive to conduct and entail the problems on coating properties, corrosion resistance, far-infrared-emitting characteristics, a limited selection of colors, and so on.

In this situation, coating methods using an inorganic salt as a binder are currently attracting attention in preference to thermal spray coating methods.

The coating methods using an inorganic salt as a binder (hereinafter referred to as "inorganic salt-coating method") comprise applying to the surface of the protective means a coating composition for forming a far-infrared-emitting layer which contains water glass or like alkali silicate, aluminum phosphate or like inorganic salt as a binder and a pigment capable of emitting far-infrared radiation and heat-treating the coating layer to form a far-infrared-emitting layer. This method is relatively inexpensive to practice.

Throughout the specification and the appended claims, the term "far-infrared-emitting characteristics" refers to characteristics for emission of far-infrared radiation.

Although advantageously cheap relative to the thermal spray coating methods, the inorganic salt-coating methods have the following shortcomings.

(A) Since the alkali silicate, aluminum phosphate or like inorganic salt used as a binder is prone to decomposition at high temperatures, the layer is imparted a reduced adhesion to the protective means.

(B) At high temperatures and under circumstances wherein sodium chloride or water vapor are likely to act, the inorganic salt used as a binder is reacted or dissolved, resulting in degradation of far-infrared-emitting layer.

(C) When a large amount of a far-infrared-emitting pigment is used to enhance the far-infrared-emitting characteristics, the layer is afforded a pronouncedly lower adhesion to the protective means.

As described hereinbefore, the inorganic salt-coating methods can advantageously use the desired far-infrared-emitting pigments selected from a wider range than the thermal spray coating methods, but involve the problems on the the coating properties at high temperatures, corrosion resistance to sodium chloride, poor far-infrared-emitting characteristics and the like.

An object of the present invention is to provide a composition for forming a far-infrared-emitting layer which composition is capable of forming a ceramics layer outstanding in far-infrared-emitting characteristics, adhesion to a substrate, resistance to corrosion and other properties.

Another object of the invention is to provide a far-infrared heater having a protective means with a farinfrared-emitting layer formed thereon and excellent in far-infrared-emitting characteristics, corrosion resistance, adhesion and other properties.

Other objects and features of the present invention will become apparent from the following description.

The present invention provides:

(I) a composition for forming a far-infrared-emitting layer, the composition comprising (i) a liquid composition which contains a material for forming ceramics (hereinafter referred to as "ceramics-forming material") and which is capable of forming a ceramics layer by gelation induced by polymerization and (ii) at least one far-infrared-emitting pigment; and (II) a far-infrared heater comprising a heat source and a protective means with a far-infrared emitting layer formed thereon by applying the composition for forming a far-infrared-emitting layer to the protective means to cause gelation of the coating layer by polymerization.

The composition for forming a far-infrared-emitting layer according to the present invention comprises a liquid composition containing a ceramics-forming material capable of forming a ceramics layer by gelation through polymerization, i.e. by sol-gel process and at least one far-infrared-emitting pigment. A variety of liquid compositions for forming a ceramics layer by sol-gel process are known among which any suitable one can be used in the invention without specific limitation. Usable liquid coating compositions contain metal alkoxide, metal hydroxide or the like as a ceramics-forming material. Preferred examples of such ceramics-forming materials are:

(i) compounds represented by the formula $$(R_1)_m M_1 (OR_2)_n \quad (1)$$

wherein $R_1$ is alkyl group having 1 to 3 carbon atoms or vinyl group, $R_2$ is hydrogen atom, methyl group, ethyl group, isopropyl group or t-butyl group, $M_1$ is Ca or Ba, m is 0 or 1 and n is 1 or 2;

(ii) compounds represented by the foremula $$(R_3)_k M_2 (OR_4)_l \quad (2)$$

wherein $R_3$ is alkyl group having 1 to 3 carbon atoms or vinyl group, $R_4$ is hydrogen atom, methyl group, ethyl group, isopropyl group or t-butyl group, $M_2$ is Al, Y or La, k is 0 or 1 and l is 2 or 3;

(iii) compounds represented by the formula $$(R_5)_i M_3 (OR_6)_j \quad (3)$$

wherein $R_5$ is alkyl group having 1 to 3 carbon atoms or vinyl group, $R_6$ is hydrogen atom, methyl group, ethyl group, isopropyl group or t-butyl group, $M_3$ is Ti, Zr, Mn, Sn, Si or Sr, i is 0 or 1 and j is 3 or 4; etc.

These compounds are usable singly or at least two of them can be used in mixture. Optionally condensation products of at least one of them may be used.

Specific examples of said ceramics-forming materials are $Ca(OCH_3)_2$, $Ca(OC_2H_5)_2$, $Ca(OC_3H_7)_2$, $Ca(OC_4H_9)_2$, $Ba(OCH_3)_2$, $Ba(OC_2H_5)_2$, $Ba(OC_3H_7)_2$, $Ba(OC_4H_9)_2$, $Al(OCH_3)_3$, $Al(OC_2H_5)_3$, $Al(OC_3H_7)_3$, $Al(OC_4H_9)_3$, $CH_3Al(OCH_3)_2$, $CH_3Al(OC_2H_5)_2$, $CH_3Al(OC_3H_7)_2$, $CH_3Al(OC_4H_9)_2$, $Ti(OCH_3)_4$, $Ti(OC_2H_5)_4$, $Ti(OC_3H_7)_4$, $Ti(OC_4H_9)_4$, $CH_3Ti(OCH_3)_3$, $CH_3Ti(OC_2H_5)_3$, $CH_3Ti(OC_3H_7)_3$, $CH_3Ti(OC_4H_9)_3$, $C_2H_5Ti(OCH_3)_3$, $C_2H_5Ti(OC_2H_5)_3$, $C_2H_5Ti(OC_3H_7)_3$, $C_2H_5Ti(OC_4H_9)_3$, $Si(OCH_3)_4$, $Si(OC_2H_5)_4$, $Si(OC_3H_7)_4$, $Si(OC_4H_9)_4$, $CH_3Si(OCH_3)_3$, $CH_3Si(OC_2H_5)_3$, $CH_3Si(OC_3H_7)_3$, $CH_3Si(OC_4H_9)_3$, $C_2H_5Si(OCH_3)_3$, $C_2H_5Si(OC_2H_5)_3$, $C_2H_5Si(OC_3H_7)_3$, $C_2H_5Si(OC_4H_9)_3$, $Zr(OCH_3)_4$, $Zr(OC_2H_5)_4$, $Zr(OC_3H_7)_4$, $Zr(OC_4H_9)_4$, $CH_3Zr(OCH_3)_3$, $CH_3Zr(OC_2H_5)_3$, $CH_3Zr(OC_3H_7)_3$, $CH_3Zr(OC_4H_9)_3$, $C_2H_5Zr(OCH_3)_3$, $C_2H_5Zr(OC_2H_5)_3$, $C_2H_5Zr(OC_3H_7)_3$, $C_2H_5Zr(OC_4H_9)_3$, $Y(OCH_3)_3$, $Y(OC_2H_5)_3$, $Y(OC_3H_7)_3$, $Y(OC_4H_9)_3$, $La(OCH_3)_3$, $La(OC_2H_5)_3$, $La(OC_3H_7)_3$, $La(OC_4H_9)_3$, $Mn(OCH_3)_4$, $Mn(OC_2H_5)_4$, $Mn(OC_3H_7)_4$, $Mn(OC_4H_9)_4$, $Sn(OCH_3)_4$, $Sn(OC_2H_5)_4$, $Sn(OC_3H_7)_4$, $Sn(OC_4H_9)_4$, $Sr(OCH_3)_4$, $Sr(OC_2H_5)_4$, $Sr(OC_3H_7)_4$, $Sr(OC_4H_9)_4$, $Ca(OH)_2$, $Ba(OH)_2$, $Al(OH)_3$, $CH_3Al(OH)_2$, $Ti(OH)_4$, $CH_3Ti(OH)_3$, $C_2H_5Ti(OH)_3$, $Si(OH)_4$, $CH_3Si(OH)_3$, $C_2H_5Si(OH)_3$, $Zr(OH)_4$, $CH_3Zr(OH)_3$, $C_2H_5Zr(OH)_3$, $Y(OH)_3$, $La(OH)_3$, $Mn(OH)_4$, $Sn(OH)_4$, $Sr(OH)_4$, etc. Condensation products of these ceramics-forming materials can be prepared from a combination of ceramics-forming materials selected as desired from said examples and can be imparted a desired molecular weight. Examples of useful condensation products are $ZrOSi(OC_2H_5)_6$, $AlOSi(OC_2H_5)_5$, $TiOSi(OC_2H_5)_6$, $(C_3H_7O)_3ZrOSi(OC_2H_5)_3$, $(C_4H_9O)_3ZrOSi(OC_2H_5)_3$, $(C_3H_7O)_3TiOSi(OC_2H_5)_3$, $(C_4H_9O)_3TiOSi(OC_2H_5)_3$, $(C_3H_7O)_2AlOSi(OC_2H_5)_3$, $(C_4H_9O)_2AlOSi(OC_2H_5)_3$, etc.

These ceramics-forming materials are used usually as dissolved or dispersed in an organic solvent, water or a mixture thereof. Ceramics-forming materials in a liquid form can be used as they are. Useful organic solvents can be any of conventional solvents usually for use in preparation of known liquid compositions usable in sol-gel process. Examples of such organic solvents are methanol, ethanol, propanol, butanol and like lower alcohols, ethylene glycol monoalkyl ether, diethylene glycol monoalkyl ether, propylene glycol monoalkyl ether, dipropylene glycol monoalkyl ether and like hydrocarbon ether alcohols having alkyl group such as methyl, ethyl, propyl butyl or the like, ethylene glycol monoalkyl ether acetate, diethylene glycol monoalkyl ether acetate, propylene glycol monoalkyl ether acetate, dipropylene glycol monoalkyl ether acetate and like esters of acetic acids with said hydrocarbon ether alcohols, ethoxy ethyl acetate and like esters of acetic acids with alcohols, methyl acetate, ethyl acetate, propyl acetate, butyl acetate and like esters of acetic acids, acetone, etc.

The concentration of the ceramics-forming material in the composition of the invention for forming a far-infrared-emitting layer is about 10 to about 90% by weight, and may be suitably determined over said range according to the properties of the ceramics-forming material to be used.

The term "far-infrared-emitting pigment" used herein refers to inorganic pigments capable of emitting far-infrared radiation of about 3 to about 1000 μm in wavelength with high efficiency at a temperature of about 50° C. or higher. Examples of such pigments are oxides of aluminum, titanium, zirconium, silicon, iron, nickel, manganese, cobalt, chromium, copper, yttrium, zinc, magnesium, calcium and the like, carbides of silicon, zirconium, tungsten, molybdenum and the like, nitrides of aluminum, titanium, silicon, boron and the like, borides of aluminum, barium, calcium and the like, sulfides of molybdenum, tungsten and the like, graphite, etc. Representative of these pigments are $Al_2O_3$, $Cr_2O_3$, $CoO$, $Co_3O_4$, $NiO$, $Fe_2O_3$, $SiO_2$, $TiO_2$, $Y_2O_5$, $ZnO$, $MnO_2$, $ZrO_2$, $Fe_3O_4$, $CuO$, $Cu_2O$, $MgO$, $CaO$, $SiC$, $ZrC$, $WC$, $MoC$, $C$, $AlB_{12}$, $BaB_6$, $CaB_6$, $MoS_2$, $WS_2$, $TiN$, $BN$, $Si_3N_4$, $AlN$, $ZrSiO_4$, $Al_6SiO_3$, $Fe_2M_nO_5$, $CaSiO_3$, $Cr_2CuMnO_6$, $CaZrO_3$, $BaTiO_3$, $CoAl_2O_4$, etc. These pigments are usable singly or at least two of them can be used in mixture.

The above-exemplified far-infrared-emitting pigments may be used as they are or in the form of a composite compound prepared by mixing together a combination of compounds, sintering or fusing the mixture and pulverizing it.

Preferred far-infrared-emitting pigments are those having a particle size of about 0.01 to about 20 μm. The amount of the far-infrared-emitting pigment used is about 5 to about 70% by weight, preferably about 30 to about 50% by weight, based on the composition of the invention.

When required, the composition for forming a far-infrared-emitting layer according to the invention may further contain a colloidal substance and/or inorganic fine powder which serve to afford a compacter far-infrared emitting layer.

The term "colloidal substance" used herein is intended to denote a liquid substance comprising liquid or solid particles and a dispersing medium, the particles having a particle size of about 10 to about 10000Å and being dispersed in the dispersing medium. Useful colloidal substances include conventional ones. Examples of useful dispersing mediums are organic solvents such as the above-exemplified lower alcohols, hydrocarbon ether alcohols, esters of acetic acids therewith and the like, water, etc. These dispersing mediums are usable singly or at least two of them can be used in mixture. The concentration of dispersed particles in the colloidal substance is about 10 to about 60% by weight. Useful colloidal substances can be any of them in the invention. Examples of such colloidal substances are colloidal silica, colloidal alumina, colloidal titanium oxide, colloidal zirconium oxide, colloidal zirconium silicate, colloidal aluminum hydroxide, colloidal zirconium hydroxide, etc.

Suitable inorganic fine powders are those having a particle size of about 5 to about 150 μm. Examples of suitable inorganic fine powders are fine powders of alumina, titanium oxide, silica or the like.

About 70% by weight or less, preferably about 3 to about 40% by weight, of the colloidal substance and/or inorganic fine powder can be incorporated into the composition in the invention.

When required, the composition of the invention may further contain a coloring pigment, a coating layer reinforcement and the like. Useful coloring pigments are usual inorganic pigments such as titanium white, titanium yellow, magnesium carbonate, dolomite, iron oxide (red, black), barium yellow, antimony yellow, cobalt blue, cobalt violet, cobalt green, manganese black, manganese blue, manganese violet, strontium chromate, talc, chromium oxide hydrate green, chromium oxide green, zinc green, barium carbonate, chalk, precipitated calcium carbonate, aluminum hydrate, fluorite, molybdate red, molybdate organge, chrome yellow, lead chromate, ultramarine, vermilion, basic lead carbonate, etc. Coloring pigments can be used conjointly with a filler for pigments, thickening agent and the like for use in conventional methods.

Useful coating layer reinforcements are inorganic fibrous materials. Representative examples are potassium titanate, silicon carbide, silicon nitride, aluminum oxide, beryllia, boron carbide, silicate glass, quartz, etc.

The composition of the invention may contain about 70% by weight or less of the coloring pigment, and about 70% by weight or less, preferably about 1 to about 65% by weight, of the coating layer reinforcement.

The composition of the invention is preferably adjusted to a pH of about 2.5 to about 6.0 to prevent rapid gelation. Usable for the adjustment of pH are inorganic or organic acids which include hydrochloric acid, acetic acid, chloroacetic acid, citric acid, maleic acid, oxalic acid, toluenesulfonic acid, glutaric acid, dimethylmalonic acid, benzoic acid, etc.

The composition of the invention may also contain about 1.5% by weight or less of a buffered latent catalyst capable of accelerating the polymerization of liquid composition by dissociation at an elevated temperature but without gelation of liquid composition at room temperature. Examples of useful buffered latent catalysts are a metal salt of carboxylic acid, amine carboxylate, quaternary ammonium carboxylate, salt of nitric acid, etc. Representative of such catalysts are dimethylamine acetate, ethanolamine acetate, dimethylaniline formate, sodium acetate, sodium propionate, potassium formate, sodium formate, benzyl trimethylammonium acetate, sodium nitrate, ammonium nitrate, etc.

According to the invention, the composition for forming a far-infrared-emitting layer is applied to the surface of the protective means to cause gelation by polymerization, whereby a far-infrared-emitting layer is formed on the protective means.

The protective means is provided in order to protect against external influence a heat source such as a burner for combustion of petroleum or flammable gases or an electrically heated wire such as nichrome wire, iron-chromium-aluminum wire, tungsten wire or the like. Useful protective means are those made of crystallized glass, quartz glass, silicate glass, mullite, alumina or the like. The shape of the protective means is not specifically limited and can be any of tubular, spherical, plate-like and other shapes which are suited to the kind of a heat source and which can conform to the configuration of the heater.

The composition of the invention can achieve a satisfactory effect by application only to the surface of the protective means. Depending on the shape of protective means, the application can be limited to an intended surface portion.

While the gelation of the composition by polymerization can proceed at room temperature in the invention, the application of heat reduces the gelation time and increases the polymerization degree, whereby a compacter far-infrared-emitting layer is formed. The higher the heating temperature, the compacter the far-frared-emitting layer becomes. Yet it is suitable from economical viewpoints to apply heat at about 100 to about 250° C. for about 10 to about 30 minutes.

During the operation of a heater, the far-infrared-emitting layer formed on the protective means is gradually converted into a compacter ceramic one and rendered more stable.

For complete prevention of pinholes in the far-infrared-emitting layer, a layer or layers can be superposed by one or more applications and curing of the composition of the invention on the far-infrared-emitting layer initially applied and dried or thermally cured over the protective means.

Optionally a liquid composition containing a ceramics-forming material but free of a pigment may be applied to the far-infrared-emitting layer formed from the composition of the invention to give a ceramics top layer of about 0.5 to about 40 μm in thickness, whereby the surface portion of far-infrared-emitting layer is made compacter and more water repellent.

In the present invention, the far-infrared-emitting layer may be given a total thickness of about 3 to about 150 μm. If the protective means is heated to about 400° C. or higher in use, it is desirable to form a far-infrared-emitting layer of about 3 to about 20 μm in thickness on the protective means.

The protective means having the far-infrared-emitting layer formed by the foregoing method can be used in a conventional manner to protect a heat source such as a burner or an electrically heated wire.

According to the invention, far-infrared-emitting pigments for use can be selected from a wide range and can be used in a large amount considered impossible in conventional inorganic salt-coating methods. With these advantages, the far-infrared-emitting layer can be made to match the far-infrared absorption characteristics of materials, articles or the like to be heated, and the emissivity of far-infrared radiation is enhanced, improving the far-infrared-emitting characteristics of the layer.

The far-infrared-emitting layer formed from the composition of the invention is a compact one chemically firmly united to the surface of protective means. Further the layer can be produced by a simple procedure of applying the composition to polymerize the same for gelation of liquid composition, hence markedly advantageous in terms of costs.

The protective means with the far-infrared-emitting layer formed from the composition of the invention has an outstanding far-infrared-emitting characteristics. The layer is pronouncedly compact and is highly corrosion-resistant to sodium chloride or water vapor, namely high in corrosion resistance, and is unlikely to peel off on exposure to high temperatures or thermal shock and excellent in coating properties. Since coloring pigments can be selected from a wide range, a desired color can be imparted to the coating layer, resulting in marked enhancement of commercial value.

Given below are Examples and Comparison Examples to clarify the present invention in greater detail. The description will be made with reference to the accompanying drawings in which.

EXAMPLE 1

Figure 1:
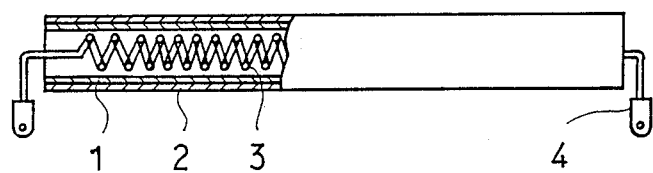
FIG. 1 is a front view schematically showing a far-infrared heater embodying the present invention with a portion partially broken away for the sake of clarity.

The far-infrared heater as shown in FIG. 1 was produced by the following method.

The composition for forming a far-infrared-emitting layer according to the invention was prepared by mixing together 60 g of a 60% solution of methyltrimethoxysilane in isopropyl alcohol, 38 g of a 10% aqueous solution of colloidal alumina, a mixture of 26 g of zircon (ZrSiO4) and 8 g of alumina (Al2O3) as far-infrared-emitting pigments, 6 g of titanium yellow as a coloring pigment and 3 g of potassium titanate fibers as a coating layer reinforcement.

The thus obtained composition of the invention was applied by a thermal spray coating method to the sandblasted surface of a crystallized glass tube (trade name Miraclon Tube, manufactured by Nippon Gaishi K.K.) used as a protective means 1. The coated protective means was heated at 150° C. for 20 minutes to complete the polycondensation reaction, giving a 20 μm-thick far-infrared-emitting layer 2 composed of yellow ceramics having the composition shown below in Table 1.

TABLE 1

| Component | Composition (wt %) |
|---|---|
| $ZrO_2 \cdot SiO_2$ | 62 |
| $Al_2O_3$ | 12 |
| $SiO_2$ | 15 |
| $TiO_2$ | 5 |
| Others | Balance |

A heating wire 3 made of iron-chromium-aluminum alloy was coiled and was provided at both ends with terminals 4. The heating wire 3 was inserted into the central part of the protective means 1 which had the far-infrared-emitting layer 2 formed thereon, whereby the far-infrared heater as depicted in FIG. 1 was completed.

For comparison with the far-infrared heater of the invention, far-infrared heaters were produced by the following method frequently carried out in the art.

(i) The surface of a crystallized glass tube used as a protective means 1 was pretreated by sandblasting and was coated with zircon by a plasma thermal spray coating method, whereby a far-infrared-emitting layer 2 of 30 μm thickness was formed (Comparison Example 1).

(ii) A far-infrared coating composition containing alkali silicate as a binder and zircon was applied to the surface of a crystallized glass tube used as a protective means 1. The coated tube was baked, whereby a far-infrared-emitting layer 2 of 20 μm thickness was formed (Comparison Example 2).

For comparison, a Miracon heater with a protected tube of crystallized glass having an untreated surface was used as a conventional heater.

The Miraclon heater and the far-infrared heaters thus prepared were evaluated in respect of (1) heat resistance, (2) thermal shock resistance, (3) corrosion resistance, (4) durability, (5) cooking performance and (6) emmisivity of far-infrared radiation.

The properties were determined by the following methods.

(1) Heat resistance

A voltage was adjusted to heat the surface of the heater to a temperature of 1000° C. After standing in this state for a predetermined time, the far-infrared-emitting layer 2 was observed to inspect whether peeling, fading or other change occurred.

(2) Thermal shock resistance

A voltage was adjusted to heat the surface of the heater to a temperature of 800° C. After the temperature of the heater reached a maximum level, a predetermined amount of water having an ordinary temperature was let fall dropwise. Then the far-infrared-emitting layer 2 was inspected to check the occurrence of peeling.

(3) Corrosion resistance

A voltage was adjusted to heat the surface of the heater to a temperature of 750° C., a saturated saline solution was let fall dropwise in an amount of 2 cc at one time. The solution was dropped repeatedly 10 times and the far-infrared-emitting layer 2 was inspected to check the occurrence of peeling and fading.

(4) Durability

A voltage was adjusted to heat the surface of the heater to a temperature of 800° C. A test was conducted by repeating 15,000 test cycles, one cycle consisting of a 3-minute energized state followed by a 1-minute de-energized state. Thereafter the peeling of the far-infra-red-emitting layer 2 was checked.

(5) Cooking performance

A loaf of bread was cut into six slices. One slice thereof was toasted in a commercial oven toaster with the far-infrared heater installed therein to determine the time until the slice was toasted to a predetermined extent. The same procedure was repeated three times to determine the average cooking time.

(6) Emissivity of a far-infrared radiation

A far-infrared-emitting layer was formed by said methods on a flat plate made of the same material as that of the crystallized glass tube. The emissivity of far-infrared radiation at wavelengths in the far-infrared region was determined, compared with emitted far-infrared radiation from a black body. The measurement was conducted with use of a measuring device equipped with a spectrometer, a furnace containing a black body and a furnace containing the coated flat plate.

Figure 2:
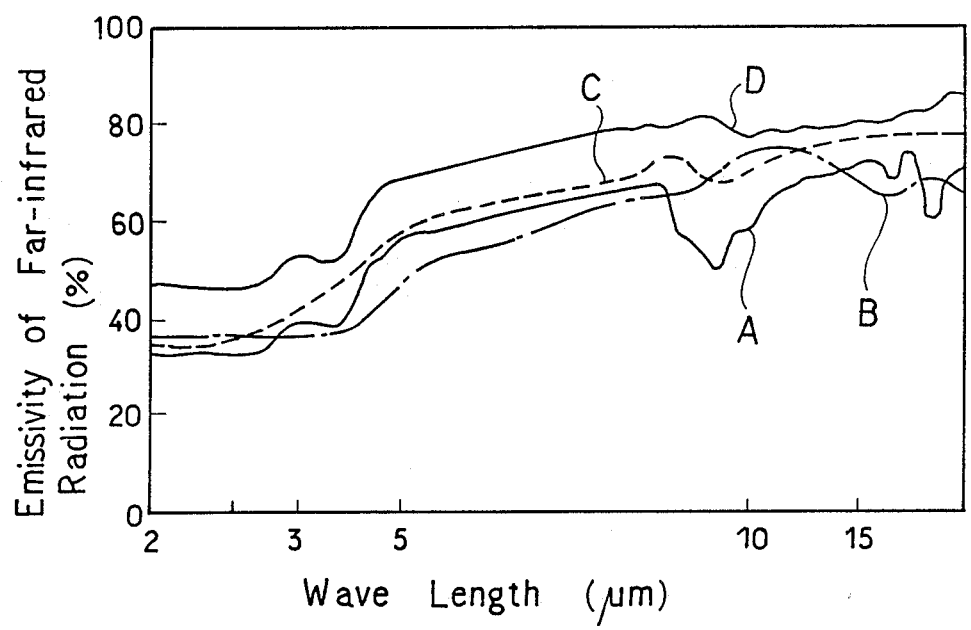
FIG. 2 shows graphs representing the emissivity of far-infrared radiation determined in Example 1 in respect of a conventional heater, heaters produced in Comparison Examples 1 and 2 and the heater of the invention.

According to the methods as described above, the heaters were evaluated with the results shown below in Table 2. FIG. 2 shows graphs representing the emissivity of far-infrared radiation.

TABLE 2

|  | Conventional heater | Heater of Comp. Ex. 1 | Heater of Comp. Ex. 2 | Heater of Invention |
|---|---|---|---|---|
| Heat resistance | No change | Faulty | Faulty | No change |
| Thermal shock resistance | No change | No change | No change | No change |
| Corrosion resistance | No change | No change | Faulty | No change |
| Durability | No change | Faulty | Faulty | No change |
| Cooking performance | 3 min | 2 min 40 sec | 2 min 45 sec | 2 min 30 sec |

In Table 2, the far-infrared-emitting layer which underwent no change as to peeling, fading or the like was represented with "Good" and the far-infraredemitting layer which had fault with "Faulty".

In FIG. 2, the emissivity of far-infrared radiation was represented with graphs among which A refers to a graph resulting from the conventional heater, B to that from the heater of Comparison Example 1, C to that from the heater of Comparison Example 2, and D to that from the heater of the invention.

As shown in Table 2, the conventional heater named Miraclon heater had a crystallized glass tube with an untreated surface as the protective means 1 so that no problem was posed in terms of heat resistance, thermal shock resistance, corrosion resistance and durability.

However, said conventional heater exhibited low cooking performance because the crystallized glass tube itself had a poor emissivity of far-infrared radiation as shown by A in FIG. 2.

A layer 2 formed on the protective means in the far-infrared heater of Comparison Example 1 was applied by a plasma thermal spray coating method. The layer 2 was relatively porous and made of only zircon highly anti-corrosive against sodium chloride so that the layer 2 showed relatively high thermal shock resistance and corrosion resistance. However, since the zircon was not chemically united with the crystallized glass tube, the layer 2 caused peeling in the performance tests for heat resistance and durability.

As shown by B in FIG. 2, the layer 2 in the heater prepared in Comparison Example 1 was slightly lower in far-infrared radiation emissivity at a long wavelength range than the heater of the invention. The heater of Comparison Example 1 was much faster in achieving cooking than the conventional heater but was not as fast as the heater of the invention.

The layer 2 in the heater of Comparison Example 2 was formed from a far-infrared coating composition containing an alkali silicate as a binder. The layer 2 was significantly low in corrosion resistance because of the presence of alkali component. The alkali component and other components were vitrified at a high temperature range and reacted with the crystallized glass tube, and a difference was caused in respect of thermal expansion. With these defects, the layer 2 was problematic also on heat resistance and durability.

In producing the far-infrared heater of the invention, the composition of the invention for forming a far-infrared-emitting layer was chemically reacted with the crystallized glass tube during polycondensation reaction, thereby forming a far-infrared-emitting layer 2 firmly adhered to the crystallized glass tube. The far-infrared-emitting layer 2 was turned into compacter ceramic one with the elevation of heater temperature, thereby becoming more stable in coated state. The potassium titanate fibers used as a coating layer reinforcement served to afford a more firm coating layer.

With such features, the far-infrared heater of the invention was excellent in properties including heat resistance, thermal shock resistance, corrosion resistance and durability.

Figure 3:
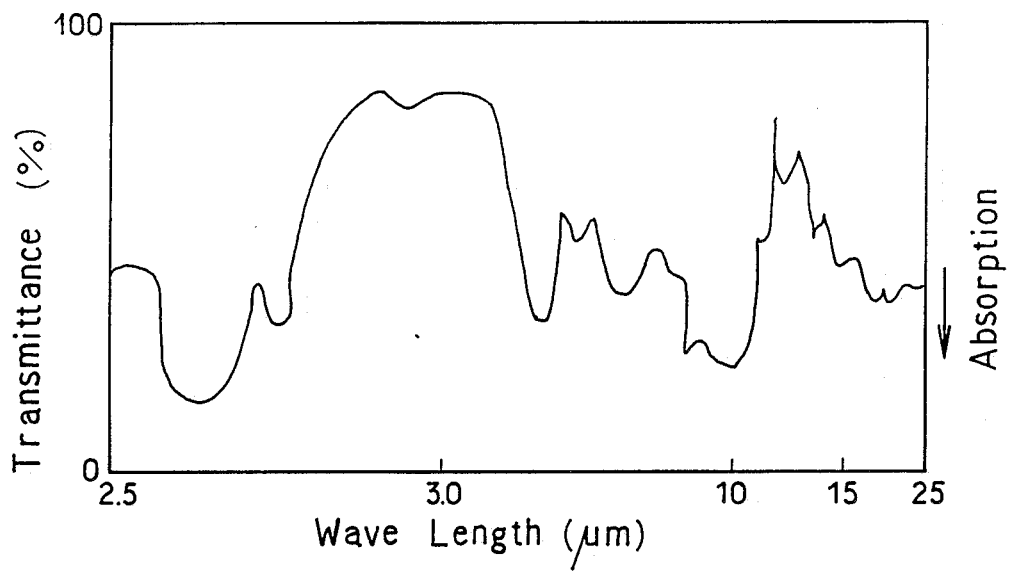
FIGS. 3 and 4 are graphs showing the far-infrared absorption characteristics of starch and melamine resin.

The layer 2 in the heater prepared according to the invention was high in emissivity of far-infrared radiation even at the long wavelength range as shown by D in FIG. 2. The far-infrared-emitting characteristics well matched the far-infrared absorption characteristics of the starch predominantly contained in the bread as shown in FIG. 3, resulting in excellent cooking performance.

With these properties, the far-infrared heater of the invention was superior in far-infrared-emitting characteristics to the Miraclon heater.

The far-infrared heater of the present invention had a layer outstanding in coating properties, corrosion resistance and far-infrared-emitting characteristics which would not be afforded by conventional methods, when compared with the heaters with the far-infrared-emitting layer formed by conventional thermal spray coating methods or inorganic salt-coating methods.

The thermal spray coating methods incur relatively high running costs and the inorganic salt-coating methods necessitate a high-temperature treatment. In other words, these conventional coating methods are relatively expensive to carry out. Since a far-infrared-emitting layer can be formed at a low temperature of 150° C. as described above, the far-infrared heater of the invention can be prepared at considerably reduced costs.

EXAMPLE 2

The surface of a quartz tube used as a protective means 1 was treated by sandblasting.

A composition for forming a far-infrared-emitting layer according to the invention was prepared by mixing together 40 g of methyltrimethoxysilane, 40 g of ethyl alcohol, 30 g of water, 75 g of a composite compound comprising iron oxide and manganese oxide ($Fe_2O_3 \cdot MnO_2$) as a far-infrared-emitting pigment, 3 g of potassium titanate fibers as a coating layer reinforcement and 0.5 g of acetic acid.

The composition of the invention thus prepared was applied by spray coating method to the sandblasted surface of said protective means 1. The coated protective means 1 was heated to 150° C. for 20 minutes to complete the polycondensation reaction, forming a 10 μm-thick far-infrared-emitting layer 2 composed of black ceramics having the composition as shown below in Table 3.

The subsequent same procedure as in Example 1 was repeated to complete the far-infrared heater of the invention as illustrated in FIG. 1.

TABLE 3

| Component | Composition (wt %) |
| --- | --- |
| $Fe_2O_3 \cdot MnO_2$ | 78 |
| $SiO_2$ | 16 |
| Others | Balance |

The heater having a quartz tube with an untreated surface was used as a representative conventional heater. The conventional heater with the quartz tube and the far-infrared heater of the invention were evaluated in terms of corrosion resistance and cooking performance by the methods as stated above in Example 1.

Table 4 shows the results.

TABLE 4

|  | Conventional Heater | Heater of Invention |
| --- | --- | --- |
| Corrosion resistance | Faulty | No change |
| Cooking performance | 2 min 55 sec | 2 min 20 sec |

Table 4 shows that the conventional heater with the quartz tube posed the problem that the quartz tube was reacted with sodium chloride to undergo devitrification, eventually becoming broken.

On the other hand, the far-infrared-emitting layer 2 in the far-infrared heater of the invention strongly resisted to the corrosive action by sodium chloride, showing excellent corrosion resistance.

The heater of the invention was able to achieve cooking in a shorter time than the conventional heater since the layer 2 in the heater of the invention was outstanding in far-infrared-emitting characteristics.

In short, the layer had improved coating properties, excellent far-infrared effect and high corrosion resistance to a corrosive substance such as sodium chloride.

EXAMPLE 3

The surface of a crystallized glass tube (trade name "Miraclon Tube") used as a protective means 1 was treated by sandblasting.

The composition of the invention for forming a far-infrared-emitting layer was prepared by mixing together 40 g of a 70% solution of a partial condensate of zirconium silicate alkoxide ($SiOZr(OC_2H_5)_6$) in isopropyl alcohol and 30 g of a 20% solution of colloidal alumina in methanol, and adding to the solution 35 g of zirconium silicate and 10 g of alumina as far-infrared-emitting pigments, 5 g of titanium yellow as a coloring pigment, 3 g of potassium titanate fibers as a coating layer reinforcement and 0.5 g of acetic acid.

The protecting means was treated in the same manner as in Example 1 with the composition of the invention thus prepared, thereby completing the far-infrared heater of the invention as depicted in FIG. 1.

In a drying furnace with the thus obtained far-infrared heater installed therein, a coating composition containing melamine resin was subjected to a curing test by drying.

The same curing test by drying was conducted in, for comparison, a conventional hot-air drying furnace.

In the curing test, there was determined time until the melamine resin applied to a steel plate cured to form a layer with a surface of 2H in pencil hardness.

Table 5 below shows the results.

TABLE 5

| Furnace | Time until attainment of 2H |
| --- | --- |
| Conventional hot-air drying furnace | 30 min |
| Drying furnace using the far-infrared heater of the invention | 10 min |

Table 5 shows that the drying furnace using the far-infrared heater of the invention took approximately ⅓ the time to achieve the same result as attained by the conventional hot-air drying furnace.

Figure 4:
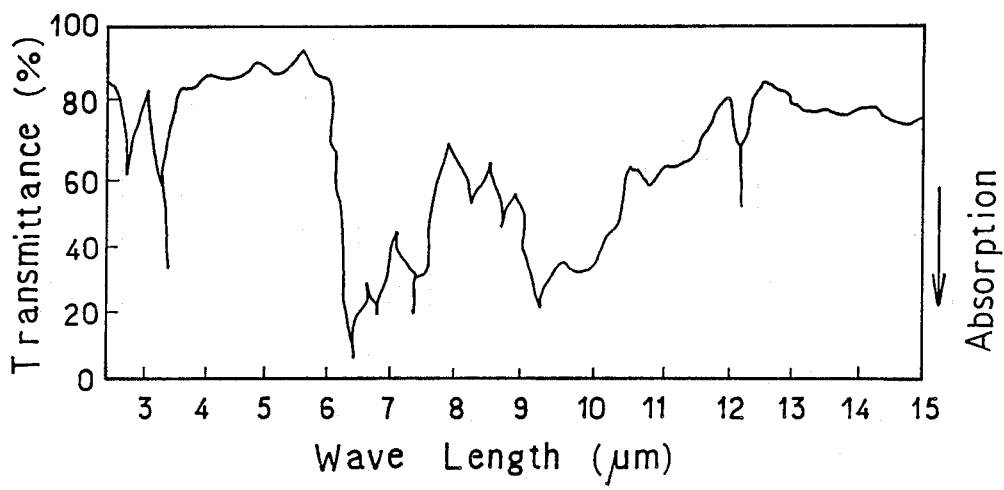

This result was produced because the far-infrared heater of the invention matched well the far-infrared absorption characteristic of the melamine resin as shown in FIG. 4.

As described above, far-infrared-emitting pigments can be selected from a wide range for preparing the composition for forming a far-infrared-emitting layer according to the invention. Consequently a far-infrared heater obtained using the thus selected far-infrared-emitting pigments is able to exhibit excellent far-infrared-emitting characteristics which match well the far-infrared absorption characteristics of materials, articles or the like to be heated with the heater.

We claim:

1. A far-infrared heater comprising a heat source and a protective means which has a far-infrared-emitting layer of 3 to 150 μm in thickness formed thereon by applying thereto a coating composition to cause gelation of the coating layer by polymerization, the coating composition comprising (i) a liquid composition which contains a ceramics-forming material and which is capable of forming a ceramics layer by gelation induced by polymerization and (ii) at least one pigment capable of emitting far-infrared radiation.

* * * * *